(12) United States Patent
Hirokawa et al.

(10) Patent No.: US 10,843,166 B2
(45) Date of Patent: Nov. 24, 2020

(54) ADSORBENT PARTICLES

(71) Applicants: TAKAHASHI METAL INDUSTRIES CO., LTD., Nagahama (JP); NIPPON SODA CO., LTD., Tokyo (JP)

(72) Inventors: Toshiyasu Hirokawa, Nagahama (JP); Tsuyoshi Noishiki, Nagahama (JP); Nobuo Kimura, Tokyo (JP); Masato Amaike, Ichihara (JP); Yukiko Takahashi, Ichihara (JP)

(73) Assignees: TAKAHASHI METAL INDUSTRIES CO., LTD., Nagahama (JP); NIPPON SODA CO., LTD., Tokyo (JP)

( * ) Notice: Subject to any disclaimer, the term of this patent is extended or adjusted under 35 U.S.C. 154(b) by 208 days.

(21) Appl. No.: 16/062,263

(22) PCT Filed: Dec. 19, 2016

(86) PCT No.: PCT/JP2016/087765
§ 371 (c)(1),
(2) Date: Jun. 14, 2018

(87) PCT Pub. No.: WO2017/110736
PCT Pub. Date: Jun. 29, 2017

(65) Prior Publication Data
US 2018/0369782 A1    Dec. 27, 2018

(30) Foreign Application Priority Data

Dec. 25, 2015 (JP) ................ 2015-253717

(51) Int. Cl.
| | | |
|---|---|---|
| *B01J 20/00* | (2006.01) | |
| *B01J 20/06* | (2006.01) | |
| *C01G 49/02* | (2006.01) | |
| *B01J 20/30* | (2006.01) | |
| *B01J 20/28* | (2006.01) | |
| *C02F 1/28* | (2006.01) | |
| *B01J 20/02* | (2006.01) | |

(52) U.S. Cl.
CPC ........ *B01J 20/06* (2013.01); *B01J 20/0229* (2013.01); *B01J 20/28* (2013.01); *B01J 20/28061* (2013.01); *B01J 20/28071* (2013.01); *B01J 20/30* (2013.01); *B01J 20/3085* (2013.01); *C01G 49/02* (2013.01); *C02F 1/28* (2013.01); *C01P 2002/01* (2013.01); *C01P 2004/61* (2013.01); *C01P 2004/62* (2013.01); *C01P 2006/10* (2013.01); *C01P 2006/12* (2013.01); *C01P 2006/14* (2013.01)

(58) Field of Classification Search
CPC .. B01J 20/0229; B01J 20/06; B01J 20/28061; B01J 20/28071; B01J 20/3085; C01G 49/02
USPC ......................................... 502/400; 423/632
See application file for complete search history.

(56) References Cited

U.S. PATENT DOCUMENTS

| | | | |
|---|---|---|---|
| 2005/0247636 A1* | 11/2005 | Schlegel | B01J 20/0229 210/688 |
| 2009/0028770 A1 | 1/2009 | Mae et al. | |
| 2010/0044631 A1 | 2/2010 | Fujita et al. | |
| 2015/0021267 A1* | 1/2015 | Choo | B01J 20/06 210/638 |

FOREIGN PATENT DOCUMENTS

| | | |
|---|---|---|
| JP | H08-59244 A | 3/1996 |
| JP | 2005-288439 A | 10/2005 |
| JP | 2006-124239 A | 5/2006 |
| JP | 2008-222525 A | 9/2008 |
| JP | 2011-235222 A | 11/2011 |
| JP | 2013-133582 A | 7/2013 |
| WO | 2006/088083 A1 | 8/2006 |

OTHER PUBLICATIONS

Translation of Japan 2006-124239, May 2006. (Year: 2006).*
Feb. 21, 2017 International Search Report issued in International Patent Application No. PCT/JP2016/087765.
Jun. 26, 2018 International Preliminary Report on Patentability issued in International Patent Application No. PCT/JP2016/087765.
Sep. 6, 2017 Office Action issued in Taiwanese Patent Application No. 105142185.
Dec. 13, 2017 Office Action issued in Taiwanese Patent Application No. 105142185.

* cited by examiner

*Primary Examiner* — Steven J Bos
(74) *Attorney, Agent, or Firm* — Oliff PLC

(57) ABSTRACT

Adsorbent particle includes iron oxyhydroxide as a main component, wherein 90% or more of volume of particle is constituted of a granular crystal having a crystal grain size of 20 nm or less or a columnar crystal having a width of 10 nm or less and length of 30 nm or less and particle has BET specific surface area of 250 m$^2$/g or more. Above adsorbent particle is produced by a method including a step of generating iron oxyhydroxide by adding base represented by YOH (wherein Y represents a monovalent atom or atomic group) to solution including at least one selected from trivalent iron compounds represented by FeX$_3$ (wherein X represents a monovalent atom or atomic group other than OH) while adjusting pH to pH 3 to 6, wherein solution has total concentration of FeX$_3$, YOH and other electrolytes of 10% by mass or more at completion of the step.

14 Claims, 5 Drawing Sheets

[Figure 1]
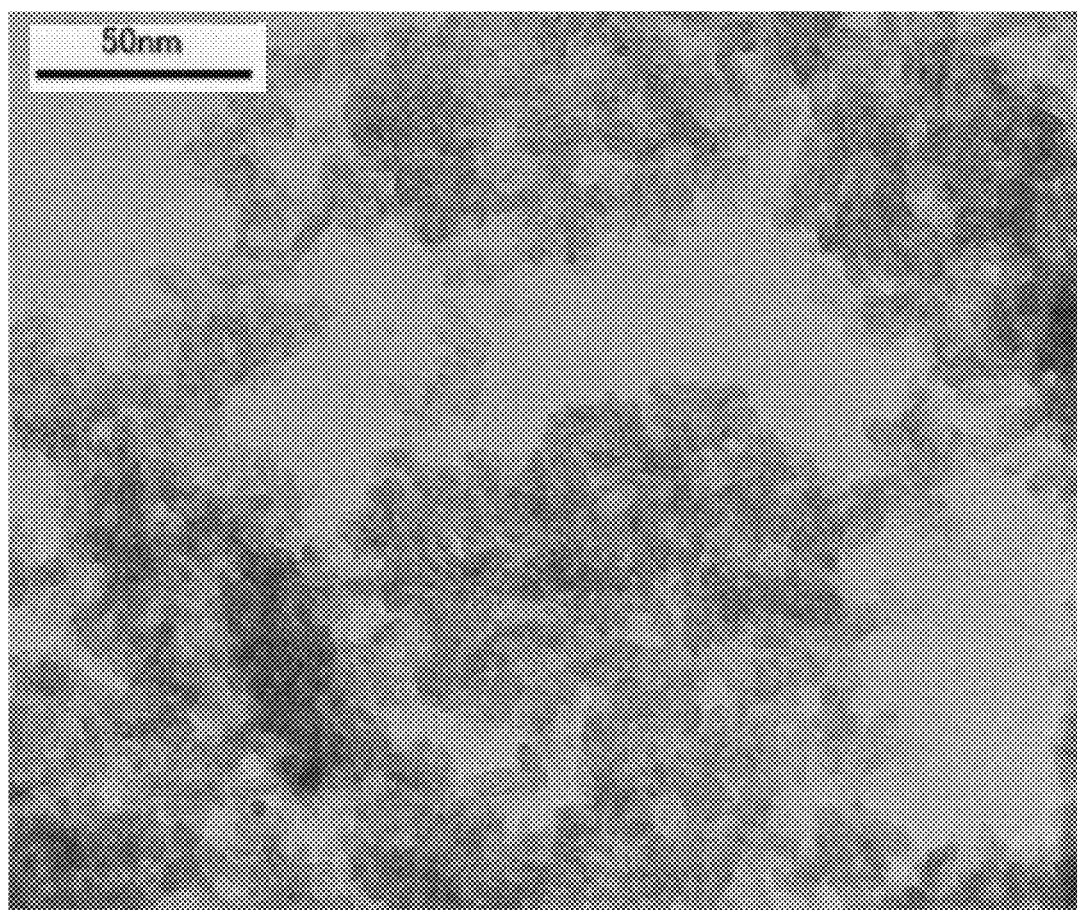

[Figure 2]
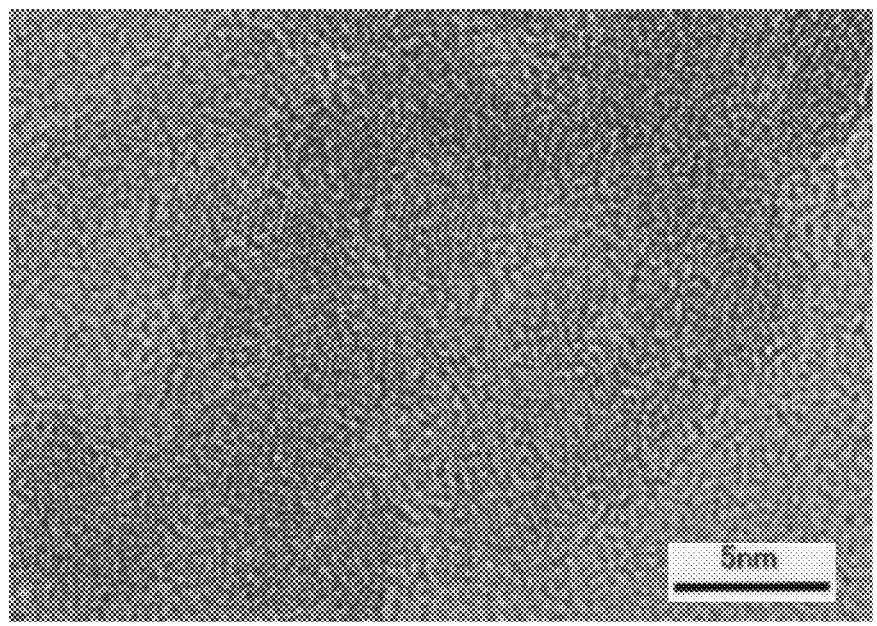

[Figure 3]
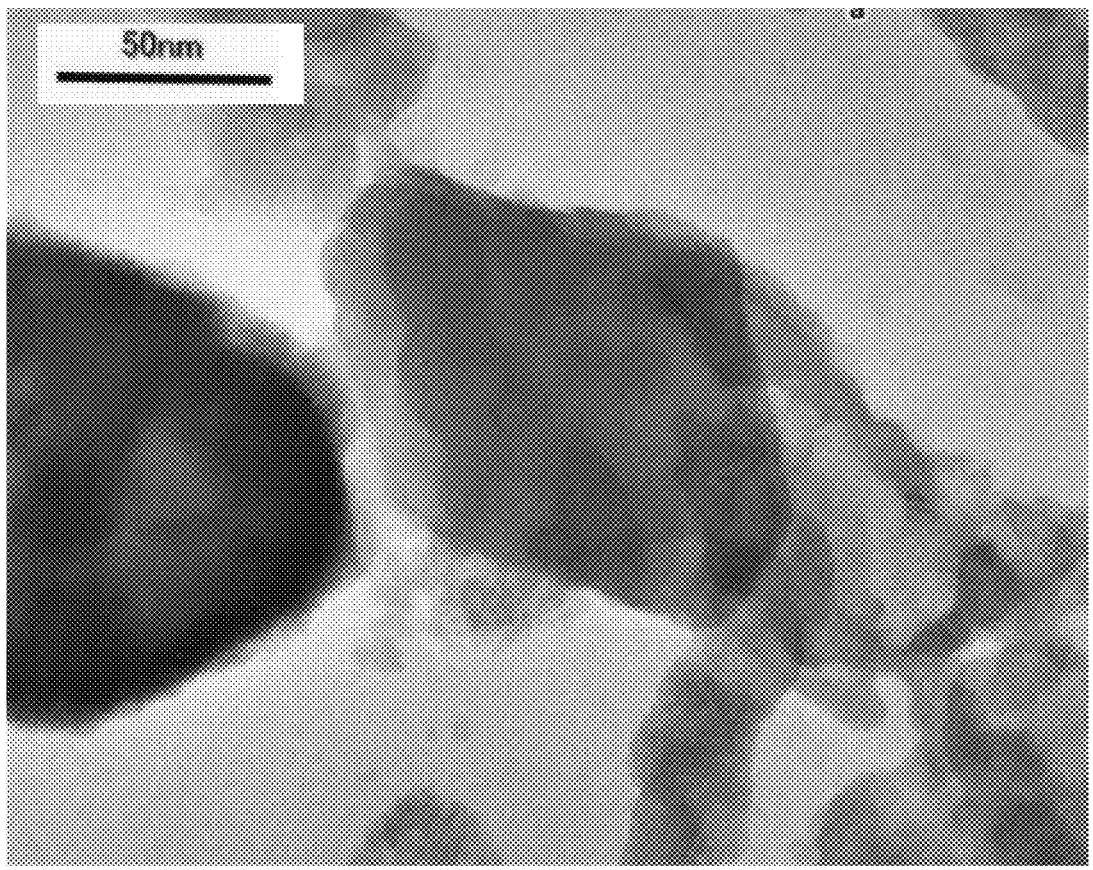

[Figure 4]
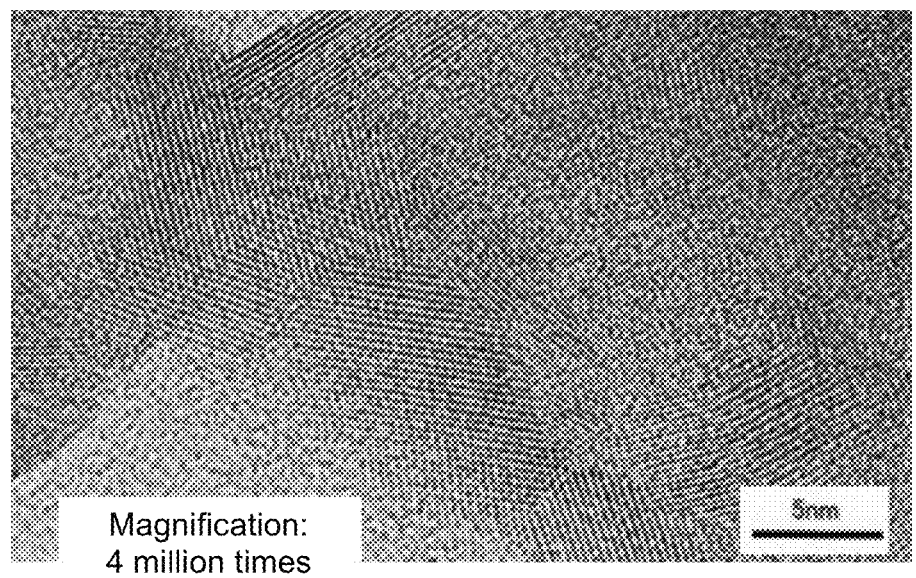

[Figure 5]
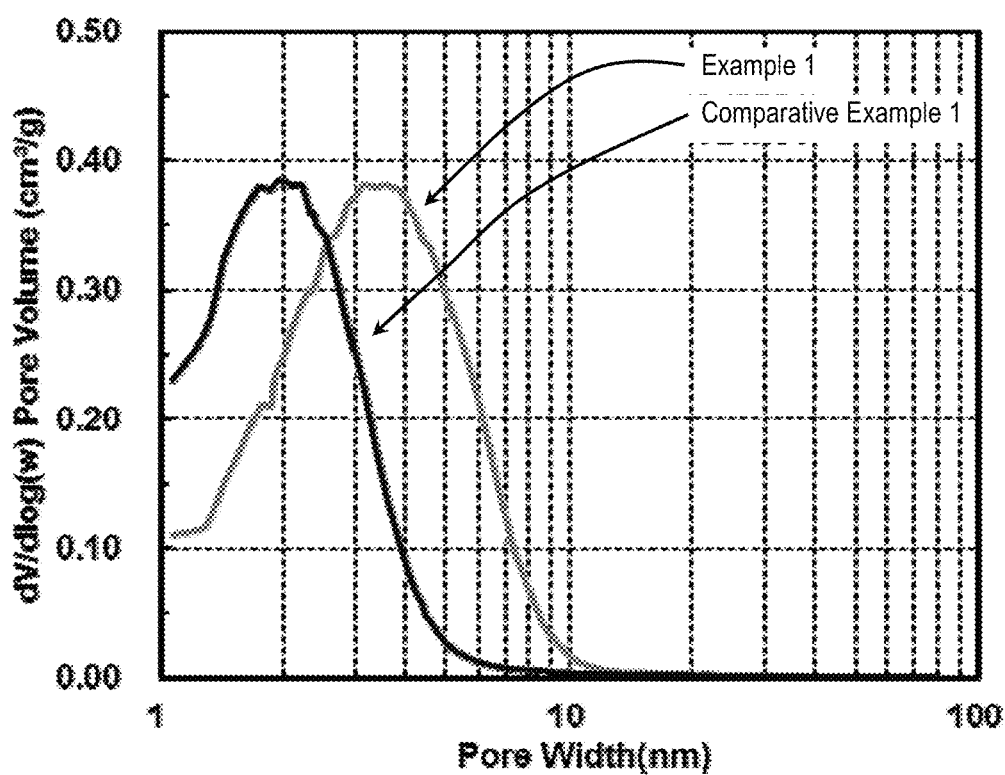

ADSORBENT PARTICLES

TECHNICAL FIELD

The present invention relates to an adsorbent comprising iron oxyhydroxide as a main component.

The present application claims priority to Japanese Patent Application No. 2015-253717 filed on Dec. 25, 2015 the contents of which is hereby incorporated.

BACKGROUND ART

To purify various types of wastewater by removing substances harmful to the environment and the human body, or to collect useful substances such as rare metal, active research is underway on adsorbents, methods of adsorption using them, methods of desorption and recovery of materials adsorbed, etc.

Phosphorus, for example, is an essential component of fertilizer and is vital in the chemical industry, but Japan is almost totally dependent on imports of the product. A large amount of phosphorus in wastewater, however, causes eutrophication, and thus discharging such wastewater is detrimental to the environment. To solve all of the above problems, attention has been paid to removal and recovery of phosphorus compounds such as phosphoric acid in wastewater.

Adsorbents made of iron oxyhydroxide (FeOOH), which are capable of adsorbing and collecting phosphorus compounds and other anions efficiently, have been developed, and disclosed in Patent Documents 1, 2, and 3.

Patent Document 4, etc. disclose an arsenic adsorbent, goethite (α-iron oxyhydroxide), having an average particle diameter of about 0.1 to 50 μm and a BET specific surface area of 20 to 100 $m^2/g$.

PRIOR ART DOCUMENTS

Patent Documents

Patent Document 1: Japanese unexamined Patent Application Publication No. 2006-124239
Patent Document 2: WO2006/088083
Patent Document 3: Japanese unexamined Patent Application Publication No. 2011-235222
Patent Document 4: Japanese unexamined Patent Application Publication No. 2008-222525

SUMMARY OF THE INVENTION

Means to Solve the Object

The present inventors have intensively studied adsorbents made of iron oxyhydroxide so as to provide adsorption rate and efficiency of adsorption higher than those of conventional products.

As a result, the inventors have found that an adsorbent exhibiting high adsorption efficiency may be obtained by adjusting the concentration of salt to a specific range in the step of generating iron oxyhydroxide in an aqueous solution containing iron ions. The present invention has been completed based on the above findings.

Accordingly, the present invention is as follows.

(1) An adsorbent particle comprising iron oxyhydroxide as a main component, wherein 90% or more of the volume of the particle is constituted of a granular crystal having a crystal grain size of 20 nm or less or a columnar crystal having a width of 10 nm or less and a length of 30 nm or less and the particle has a BET specific surface area of 250 $m^2/g$ or more.

(2) The adsorbent particle according to (1), wherein the particle has a total pore volume of 0.18 mL/g or more.

(3) The adsorbent particle according to (1) or (2), wherein a crystal grain can be observed using a transmission electron microscope without coagulation.

(4) The adsorbent particle according to any one of (1) to (3), wherein the iron oxyhydroxide has a β-type crystal structure.

(5) The adsorbent particle according to any one of (1) to (4), wherein a part of hydroxyl groups of the iron oxyhydroxide is substituted by a chloride ion.

(6) The adsorbent particle according to any one of (1) to (5), wherein the adsorbent particle has an average particle diameter of 0.2 mm-1.0 mm.

(7) The adsorbent particle according to any one of (1) to (6), wherein the adsorbent particle has a true density of 3 $g/cm^3$ or more and a bulk density of 1.2 $g/cm^3$ or more.

(8) The adsorbent particle according to any one of (1) to (7), wherein the adsorbent particle is an anion adsorbent.

(9) The anion adsorbent particle according to (8), wherein the adsorbed amount in terms of phosphorus is 25 mg or more per g of the adsorbent after 24 hours in a batch adsorption test in which 1 g of the adsorbent is added to 150 mL of an aqueous solution of potassium dihydrogen phosphate adjusted to pH 3.5 with hydrochloric acid and having a concentration of 400 mg-P/L in terms of phosphorus and the mixture is stirred at room temperature.

(10) The anion adsorbent particle according to (8), wherein the adsorbed amount in terms of phosphorus is 20 mg or more per g of the adsorbent after 1 hour in a batch adsorption test in which 1 g of the adsorbent is added to 150 mL of an aqueous solution of potassium dihydrogen phosphate adjusted to pH 3.5 with hydrochloric acid and having a concentration of 400 mg-P/L in terms of phosphorus and the mixture is stirred at room temperature.

(11) The anion adsorbent particle according to (8), wherein, in a batch adsorption test in which 1 g of the adsorbent is added to 150 mL of an aqueous solution of potassium dihydrogen phosphate adjusted to pH 3.5 with hydrochloric acid and having a concentration of 400 mg-P/L in terms of phosphorus and the mixture is stirred at room temperature, the pH after 24 hours is increased by 0.5 or more from the pH after 1 hour.

(12) The anion adsorbent particle according to any one of (8) to (11), wherein the adsorption particle has an adsorbed amount at breakthrough of 20 g-P/L or more per volume of the adsorbent packed, in a flow test in which an aqueous solution of potassium dihydrogen phosphate adjusted to pH 3 with hydrochloric acid and having a concentration of 100 mg-P/L in terms of phosphorus is passed through a column having an inner diameter of 26 mm φ packed with 20 g of the adsorbent at room temperature at a flow rate (SV) of 20 $hr^{-1}$.

(13) The anion adsorbent according to (12), wherein the adsorption particle has an adsorbed amount at breakthrough of 10 g-P/L or more at a flow rate (SV) of 50 $hr^{-1}$.

(14) A method for producing the adsorbent particle according to any one of (1) to (13), comprising the step of generating iron oxyhydroxide by adding a base represented by YOH (wherein Y represents a monovalent atom or atomic group) to a solution comprising at least one selected from trivalent iron compounds represented by $FeX_3$ (wherein X represents a monovalent atom or atomic group other than OH) while adjusting the pH to pH 3 to 6, wherein a total concentration of $FeX_3$, YOH and other electrolytes is 10% by mass or more at the completion of the step.

(15) A method for producing the adsorbent particle according to any one of (1) to (13), comprising the steps of: generating iron oxyhydroxide by adding a base represented by YOH (wherein Y represents a monovalent atom or atomic group) to a solution comprising at least one selected from trivalent iron compounds represented by $FeX_3$ (wherein X represents a monovalent atom or atomic group other than OH) while adjusting the pH to pH 3 to 6; and recovering the iron oxyhydroxide generated in the previous step in the form of a water-containing cake and drying the same, wherein the water-containing cake is dried in the drying step in a state in which the cake comprises a total of 10% by mass or more of a by-product represented by YX (wherein X and Y are the same as the above) and other electrolytes on a dry basis.

Effect of the Invention

The present invention provides an adsorbent which exhibits high adsorption efficiency in a shorter time than that for conventional products.

BRIEF DESCRIPTION OF DRAWINGS

FIG. 1 A TEM image of iron oxyhydroxide crystals obtained in Example 1.

FIG. 2 A TEM image of the iron oxyhydroxide crystals obtained in Example 1 at a higher magnification.

FIG. 3 A TEM image of iron oxyhydroxide crystals obtained in Comparative Example 1.

FIG. 4 A TEM image of the iron oxyhydroxide crystals obtained in Comparative Example 1 at a higher magnification.

FIG. 5 A graph showing pore size distribution in a mesopore-micropore region.

ADSORBENT

The adsorbent particle of the present invention comprises iron oxyhydroxide as a main component, wherein a granular crystal having a crystal grain size of 20 nm or less or a columnar crystal 10 nm or less wide and 30 nm or less long accounts for 90% or more of the volume of the particles and the particle has a BET specific surface area of 250 $m^2/g$ or more.

The form of a crystal of the adsorbent particle of the present invention may be observed using a transmission electron microscope (TEM). Specifically, the particle may be observed using a TEM at a magnification of 4 million times. From crystal fringes found in the observation, it is possible to confirm that a crystal is formed and the type and the form of the crystal. As described later, since in the adsorbent particle of the present invention, the outlines of the crystals are distinct, and the form of the crystals may be easily determined.

Such observation reveals that 90% or more of the volume of the particle is constituted of a granular crystal having a crystal grain size of 20 nm or less or a columnar crystal having a width of 10 nm or less and a length of 30 nm or less. The "granular crystal" as used herein means that a needle crystal and a plate crystal are excluded, and this more specifically means that the longitudinal length/latitudinal length ratio of the crystal is 3 or less. The crystal form of the adsorbent particle of the present invention is a granular crystal having a grain size of 20 nm or less, or a columnar crystal having a width of 10 nm or less and a length of 30 nm or less, and their ratio is 90% or more of the volume of the particles. The ratio is more preferably 100%.

The lower limit of the size of the crystal accounting for 90% or more of the volume of the particles is not particularly limited, and for the granular crystal, the grain size is usually 2 nm or more, and for the columnar crystal, the width is 1 nm or more and the length is 3 nm or more.

The adsorbent particle of the present invention has a BET specific surface area of 250 $m^2/g$ or more, and preferably 280 $m^2/g$ or more. This enables highly efficient adsorption. The upper limit of the BET specific surface area is not particularly limited, and is usually 450 $m^2/g$ or less.

The adsorbent particle of the present invention has a total pore volume of preferably 0.18 ml/g or more. The upper limit of the total pore volume is not particularly limited, and is usually 0.4 ml/g or less. The total pore volume may be measured by a single point gas adsorption method.

Furthermore, the adsorbent particle of the present invention preferably has a peak of pore size distribution at a pore size ranging from 2.5 to 5 nm in the mesopore-macropore region (pore size 1.0 to 100 nm). Moreover, pores having a pore size of 2.5 nm or more preferably account for 50% or more of the pore volume of the pores in the mesopore to macropore region. The pore size distribution may be measured by a three point gas adsorption method.

It is preferred that in the adsorbent particle of the present invention, crystal grains may be observed using a transmission electron microscope (TEM) without coagulation. More specifically, in a TEM observation performed in the same manner as described above, portions with uniform crystal fringes in the same direction are crystallites.

In crystalline substances, crystallites generally have an indistinct outline (or crystal grain boundaries), and some crystallites are distinguishable from neighboring crystallites only by the difference in crystal fringes. In other words, a plurality of crystallites is coagulated to form a larger grain.

However, in a TEM observation of the adsorbent particle of the present invention, boundaries of crystallites are all clear, and each crystallite is distinguishable as a grain (crystal grain). This is what is meant by the above description: "crystal grains can be observed without coagulation."

Iron oxyhydroxide has excellent adsorption properties for anions.

Preferably, the content of iron oxyhydroxide in the adsorbent particle of the present invention is 99% by mass or more and the content of substances other than iron compounds is 1% by mass or less. Those in which the content of iron oxyhydroxide is substantially 100% by mass are most preferred.

Iron oxyhydroxide includes α type, β type, γ type and amorphous type depending on the difference in the crystal structure. Of them, β-iron oxyhydroxide has particularly excellent adsorption capacity, and is suitable as an adsorbent for a phosphate ion, phosphite ion, hypophosphite ion, sulfate ion, nitrate ion, fluoride ion, etc.

The adsorbent particle of the present invention also preferably contains the above β-iron oxyhydroxide as a main component.

In β-iron oxyhydroxide, usually a part of the hydroxyl groups is substituted by a chloride ion. When β-iron oxyhydroxide comes into contact with water in the process of production or use, these chlorine ions are removed, and small vacancies remain. It is considered that these vacancies are involved in the adsorption of anions of fluorine and the like, and the efficient adsorption of anions in the present invention is considered to be attributable to the vacancies.

The chloride ions content in iron oxyhydroxide which is the main component of the adsorbent particle of the present invention is preferably 0.5% by mass or more, and more preferably 3% by mass or more.

The β-type crystal structure may be observed using X-ray diffraction or TEM. In X-ray diffraction, crystal forms may be identified from specific diffraction peaks. When using a TEM, lattice spacing is determined according to FFT (fast Fourier transformation) in a TEM image, and the crystal form may be identified from the specific lattice spacing.

The adsorbent particle of the present invention has preferably an average particle diameter of 0.2 mm to 1.0 mm. An excessively small particle diameter makes the adsorbent powdery and thus difficult to handle, and also causes a decrease in the flow rate. An excessively large particle diameter means that the contact area with liquid, which is the target of adsorption, is small, and thus adsorption efficiency may be reduced. Thus, the particle diameter in the above range is most suitable.

A large aggregate may be crushed so that the average particle diameter of the adsorbent particle of the present invention is adjusted to the above range. However, the average particle diameter naturally falls within that range by using the step of allowing an adsorbent which has once been dried to be in contact with water and then drying the same as described later on a method for producing.

Furthermore, the adsorbent particle of the present invention has a true density of 3 $g/cm^3$ or more and a bulk density of 1.2 $g/cm^3$ or more. The upper limit of those values, which is not particularly limited, is usually 6 $g/cm^3$ or less for the true density, and 3 $g/cm^3$ or less for the bulk density.

If necessary, the average particle diameter may be made smaller than the above average particle diameter by dry grinding and/or wet grinding, or classification using a sieve, etc. Such small size-adsorbent particles have an average particle diameter in the range of, for example, 70 μm or less, and
(1) 5 to 70 μm, more preferably 30 to 70 μm, particularly preferably a d10 of 5 μm or more; or
(2) 2 μm or less, more preferably 0.02 to 0.2 μm, and particularly preferably 0.05 to 0.15 μm.

Those small size-adsorbent particles have particularly high adsorption rate. (2) may be dispersed in a solvent such as water. In particular, when the average particle diameter is adjusted to 0.2 μm or less, a stable nanodispersion liquid may be formed, in which particles aggregate or precipitate when adsorbing anions. Although they are difficult to use in applications other than special ones, an adsorbent which is easy to use in general purposes and has high adsorption rate may be produced by method:
(3) in which material (1) and/or (2) are/is granulated to produce a granulated product having a larger particle diameter, preferably a particle diameter of 0.1 mm or more; or
(4) in which a porous carrier is impregnated with a dispersion liquid prepared by dispersing (1) and/or (2) in a solvent and the resultant is dried to give an adsorbent carrier, and the carrier is preferably formed into a sheet having a thickness of 5 mm or more, or particles having a diameter of 5 mm or more.

While the adsorbent particle of the present invention may also be used in a gas phase to adsorb, for example, harmful substances in exhaust gas, the adsorbent particle is more preferably used in a liquid phase.

When an adsorbent is used in a liquid phase, usually it takes time for components contained in the liquid to reach pores by diffusion, and thus it takes time until adsorption equilibrium is attained.

The adsorbent particle of the present invention is capable of greatly reducing the time required to adsorb a certain amount of substances, thereby achieving efficient adsorption compared to conventional adsorbents.

Although a liquid phase which is homogeneous in portions other than an adsorbent, e.g., an organic solvent solution, may be used as the above liquid phase without any problem, it is preferable to use the adsorbent in an aqueous solution for the purpose of removing harmful substances recovering useful materials or the like, which is described above as the object.

(Adsorption Rate)

The adsorbent particle of the present invention has a high adsorption rate.

The adsorption rate may be measured by the following batch adsorption test.

150 mL of an aqueous solution of potassium dihydrogen phosphate adjusted to a certain pH with hydrochloric acid and having a concentration of 400 mg-P/L in terms of phosphorus is prepared. 1 g of the adsorbent particles is added thereto and the mixture is stirred at room temperature. The aqueous solution is sampled after a given time to measure the concentration of phosphate ions and determine the adsorbed amount.

When the pH of the aqueous solution is adjusted to 3.5 in the above method, the adsorbed amount in terms of phosphorus of the adsorbent particle and the granulated adsorbent of the present invention after 24 hours is 25 mg or more, more preferably 30 mg or more. The adsorbed amount in terms of phosphorus of the adsorbent particle of the present invention is more preferably 20 mg or more after 1 hour in the same condition.

Furthermore, in the process of using the adsorbent particle of the present invention in water as an anion adsorbent, the pH is remarkably increased. This is specifically shown in the following method.

150 mL of an aqueous solution of potassium dihydrogen phosphate adjusted to a certain pH with hydrochloric acid and having a concentration of 400 mg-P/L in terms of phosphorus is prepared. 1 g of the adsorbent is added thereto and the mixture is stirred at room temperature. The aqueous solution is sampled after a given time to measure the pH.

When the pH of the aqueous solution is adjusted to 3.5 in the above method, and when the adsorbent particle of the present invention is added to the solution, the pH of the aqueous solution after 24 hours is increased by 0.5 or more from the pH of the aqueous solution after 1 hour.

On the other hand, when adsorbent particles comprising β-iron oxyhydroxide as a main component and having an average particle diameter of about 0.2 mm to 1.0 mm, but not having the specific properties of the adsorbent particle of the present invention are added to the solution, there is almost no change in the pH of an aqueous solution in the same condition.

The above properties seem to be derived from exchange of phosphate ions with hydroxyl groups existing on the surface of the adsorbent particle of the present invention and the consequent strong bond of phosphate ions to the adsorbent.

In adsorbents for phosphoric acid which comprise β-iron oxyhydroxide as a main component, phosphate ions have been considered to be bonded to a hydroxyl group through a hydrogen bond, and their exchange with a hydroxyl group has not been suggested.

A more practical method of using the adsorbent particle of the present invention is to allow water to pass through an adsorption apparatus packed with the adsorbent particles to adsorb target anions.

The point at which the concentration of target anions in water which has been treated starts to increase is called a breakthrough point. The breakthrough point may be specifically determined based on the type of target anions, the concentration of the ion in the water before treatment, etc. When the target anion is phosphate ions, the point at which the concentration reaches 10 mg-P/L (in terms of phosphorus) is regarded as the breakthrough point. The breakthrough point varies also depending on the flow rate.

The amount of the target anion adsorbed to the adsorbent at the breakthrough point is referred to as the adsorbed amount at breakthrough. The larger the adsorbed amount at breakthrough, the higher the adsorption efficiency. The adsorbed amount at breakthrough varies also depending on the flow rate. Usually the higher the flow rate, the lower the adsorbed amount at breakthrough.

For example, in the case where a specific column is packed with a certain amount of adsorbent particles and water containing phosphate ions at a given concentration is passed through the column at a certain flow rate, the concentration of phosphoric acid in effluent is measured with time until the breakthrough point is reached, and the adsorbed amount at breakthrough, g-P/L (in terms of the mass of phosphorus) per volume packed of the adsorbent (per unit volume of the adsorbent packed in the column) is calculated from the measured value to estimate practical adsorption capacity.

More specifically, the adsorbent particle of the present invention has a capacity with an adsorbed amount at breakthrough of 20 g-P/L or more in a flow test in which an aqueous solution of potassium dihydrogen phosphate adjusted to pH 3 with hydrochloric acid and having a concentration of 100 mg-P/L in terms of phosphorus is passed through a column having an inner diameter of 26 mm $\varphi$ packed with 20 g of the adsorbent at room temperature at a flow rate (SV) of 20 $hr^{-1}$. The adsorbed amount at breakthrough is more preferably 25 g-P/L or more.

The adsorbent particle of the present invention also has a high capacity with an adsorbed amount at breakthrough of 10 g-P/L or more in a flow test in the same condition as the above except for passing at a flow rate (SV) of 50 $hr^{-1}$. The adsorbed amount at breakthrough is more preferably 15 g-P/L.

After adsorbing anions, the adsorbent particle of the present invention is contacted with a base in water to be alkalified, and thus the anions are desorbed.

To recover anions such as phosphate ions, methods of recovering anions in the form of a poorly water-soluble compound have often been used. Those methods are suitable for simple recovery, but required some efforts in making recovered substances reusable. However, using the adsorbent particle of the present invention allows substances to be recovered in the form of an aqueous solution of a water-soluble salt at a high concentration, and thus the subsequent treatment is easy.

The base used for the above desorption is not particularly limited, and for the easiness in treatment mentioned above, a base which forms a highly water-soluble salt upon the treatment of desorption is preferred. The base may be selected depending on the type of anions and the method of post-treatment. For example, alkali metal hydroxides such as sodium hydroxide and potassium hydroxide, alkali metal carbonates such as sodium carbonate and potassium carbonate, and ammonia may be used.

An aqueous solution of such a base is prepared and contacted with the adsorbent of the present invention to which anions are adsorbed, and thus the anions are desorbed and eluted into the aqueous solution. The aqueous solution has preferably a pH of 10 or more, particularly preferably of 13 or more.

(Method of Production)

The adsorbent particle of the present invention is typically produced by any one of the following methods, but the methods are not particularly limited thereto.

(Method of Production 1)

First, a solution of at least one selected from trivalent iron compounds represented by $FeX_3$ (wherein X represents a monovalent atom or atomic group other than OH) is prepared. Examples of such iron compounds include ferric chloride, basic ferric chloride and ferric nitrate. Those containing at least a chloride ion as the ion represented by $X^-$ are preferred, and ferric chloride ($FeCl_3$) is particularly preferred.

The solvent for the above solution is not particularly limited as long as it may dissolve the iron compound and the base described later and does not dissolve iron oxyhydroxide. The solvent is preferably water, and may contain a solute other than the iron compound, such as electrolyte.

A base represented by YOH (wherein Y represents a monovalent atom or atomic group) is added to the solution with stirring as needed while adjusting the pH in the range of pH 3 to 6, preferably pH 3.3 to 6. The base is used to neutralize the acidic solution of the iron compound to generate a precipitate containing iron oxyhydroxide. Specific examples thereof include sodium hydroxide, potassium hydroxide and ammonia water, and of them, sodium hydroxide is particularly preferred. Furthermore, a solution of the base may be previously prepared using a solvent similar to the solvents described above. This step generates iron oxyhydroxide, and iron oxyhydroxide precipitates as an insoluble matter. The solution may be continuously stirred for a while as necessary even after the completion of addition of the base. This may give iron oxyhydroxide containing β type as a main component.

Furthermore, it is essential that when the addition of the base is completed, the total concentration of the iron compound represented by $FeX_3$, the base represented by YOH and other electrolytes (concentration determined from the amounts of the respective components used as a raw material) is 10% by mass or more. The upper limit of the concentration is not particularly limited as long as the raw materials are completely dissolved, and is usually 30% by mass or less. This may provide properties of the adsorbent particle of the present invention of being a fine granular crystal, or a short columnar crystal without coagulation of crystal grains.

The amounts of the above respective components may be determined appropriately so that the adsorbent particles finally obtained satisfy the properties described above and thus have the optimum adsorption efficiency. To this end, when, for example, the amount of the iron compound represented by $FeX_3$ and the amount of the base represented by YOH are small, the above total concentration may be adjusted to 10% by mass or more by previously dissolving electrolyte other than the iron compound in the above solution of the iron compound, or by adding electrolyte other than the iron compound or its solution thereto in the step of preparing iron oxyhydroxide. The electrolyte, which is not particularly limited, is preferably a salt containing chloride ions. Examples thereof include potassium chloride, sodium chloride, ammonium chloride and calcium chloride, and sodium chloride is particularly preferred.

The precipitate containing iron oxyhydroxide as a main component obtained by the above method may be filtered and recovered in the form of a water-containing cake.

Furthermore, it is preferable to carry out the step of drying the water-containing cake and the step of contacting the dried product with water and then removing water to dry the product after the above steps.

The above two drying steps are carried out preferably at 140° C. or less, and more preferably 100 to 140° C. For the temperature of drying, drying at low temperature takes time and thus is not suitable for efficient production. Drying at high temperature tends to reduce the number of sites to which anions are adsorbed, and drying at a higher temperature causes transformation into iron oxide, and thus is not preferred. The product may be dried in air, vacuum, or inert gas.

In the step of contacting the dried product with water, it is considered that impurities such as sodium chloride is eluted to leave a pore, resulting in an increase in the specific surface area and an increase in the number of sites to which anions are adsorbed.

The subsequent further drying may give particles having an average particle diameter of 0.2 mm to 1.0 mm.

(Method of Production 2)

Method 2 may be carried out in the same manner as in Method 1 except for the conditions noted below.

First, a solution of at least one selected from trivalent iron compounds represented by $FeX_3$ is prepared. A base represented by YOH is added to the solution while adjusting the pH in the range of pH 3 to 6. This generates iron oxyhydroxide.

Note that it is not always required that the total concentration of the iron compound represented by $FeX_3$, the base represented by YOH and other electrolytes is 10% by mass or more at the completion of the above step.

Next, the precipitate containing iron oxyhydroxide as a main component obtained in the above step is recovered by, e.g., filtration and centrifugation in the form of a water-containing cake, and the cake is dried.

It is essential that the water-containing cake be dried in the drying step in a state in which the cake includes a total of 10% by mass or more of a by-product represented by YX (wherein X and Y are the same as the above) and other electrolytes on a dry basis. The upper limit of the concentration, which is not particularly limited, is usually 50% by mass or less.

More specifically, the concentration of the iron compound represented by $FeX_3$ and the concentration of the base represented by YOH may be increased so that the amount of the by-product represented by YX is increased, or electrolyte (e.g., the same types as described above) or a solution thereof may be added to the solution before recovering precipitate after the step of producing iron oxyhydroxide.

This method may also provide properties of the adsorbent particle of the present invention of being a fine granular crystal, or a short columnar crystal without coagulation of crystal grains.

Furthermore, it is preferable to carry out the step of contacting the obtained dried product with water and then drying the product after the above steps.

The above two drying steps are carried out preferably at 140° C. or less, and more preferably at 100 to 140° C. as in Method of production 1.

For the application of the adsorbent particle of the present invention, the adsorbent particle is particularly suitable for removing and/or recovering components such as phosphoric acid as the target of adsorption from wastewater as described above.

The adsorbent particle of the present invention may also be used as a drug for oral administration, a drug which suppresses the level of phosphate in the body, or a material thereof, utilizing its adsorption properties.

EXAMPLES

Next, the present invention will be explained in more detail by means of Examples, but the present invention is not intended to be limited thereto.

Method of Measurement (Powder X-Ray Diffraction)

X-ray diffraction (XRD) patterns were measured by using X-ray diffraction system, Ultima IV (manufactured by Rigaku Corporation). A CuKα tube was used in the measurement. The average crystallite size was calculated from XRD according to the Scherrer's equation.

(Specific Surface Area)

The specific surface area was measured by a gas adsorption method by using specific surface area measurement equipment, Macsorb HM 1210 (manufactured by Mountech Co., Ltd.).

(Total Pore Volume)

The total pore volume was measured by using a gas adsorption analyzer, 3FLEX manufactured by Micrometrics by a single point nitrogen gas adsorption method after a pretreatment at 100° C. for about 15 hours.

(Pore Size Distribution)

The pore size distribution was measured by a three-point BET method using nitrogen gas.

(TEM Observation and FFT Analysis)

For the TEM (transmission electron microscope) observation of the sample, the sample was observed using a transmission electron microscope, JEM 2010F (manufactured by JEOL, accelerating voltage of 200 kV). Furthermore, FFT (fast Fourier transform) analysis in this case was performed by using Digital Micrograph manufactured by Gatan, Inc.

(Chloride Ion Content in Iron Oxyhydroxide)

A sample of iron oxyhydroxide was dissolved in 3M sulfuric acid, then the solution was diluted with an alkaline solution to precipitate iron and the resultant was filtered through a filter to recover the filtrate, and the filtrate was quantitatively analyzed by an ion chromatography method (DX-500 model manufactured by Nippon Dionex K.K.).

Example 1

A 12 mol/L aqueous solution of sodium hydroxide (NaOH) was added dropwise to a 0.764 mol/L aqueous solution of ferric chloride ($FeCl_3$) at room temperature while adjusting the pH to pH 6 or less to perform reaction with the final amount of NaOH added set at $NaOH/FeCl_3$ (molar ratio)=2.83, thereby obtaining a particle suspension of iron oxyhydroxide. The total concentration of ferric chloride and sodium hydroxide was 17.6% by mass in the above.

The suspension was filtered and the resultant was dried in the air at 120° C. to obtain iron oxyhydroxide particles (1) containing sodium chloride (NaCl). The content of NaCl in iron oxyhydroxide particle (1) was 20.5% by mass on average when iron oxyhydroxide particle (1) was taken as 100.

Iron oxyhydroxide particles (1) were washed with ion exchange water and the resultant was dried in the air at 120° C. to obtain iron oxyhydroxide particles (2). The content of NaCl in iron oxyhydroxide particle (2) was 0.5% by mass on average when iron oxyhydroxide particle (2) was taken as 100.

90% by mass or more of iron oxyhydroxide particles (2) obtained above had a particle diameter of 0.1 mm-5 mm. X-ray diffraction showed that the iron oxyhydroxide had a β-type crystal structure and an average crystallite size of 3 nm.

The state observed using a transmission electron microscope (TEM) is shown in FIG. 1. An image at a higher magnification is shown in FIG. 2. The TEM observation showed that most of the crystallites were in the form of granules having a size of 5 to 10 nm or columns having a width of 5 to 10 nm and a length of 8 to nm, and the crystallites had distinct boundaries without agglomeration of grains.

Furthermore, the particles had a specific surface area of 285 m$^2$/g, a total pore volume of 0.21 ml/g, a chloride ion content of 5.8 wt %, a true density of 3.16 g/cm$^3$, and a bulk density of 1.26 g/cm$^3$.

The pore size distribution is shown in FIG. 5. The peak was at about 3.5 nm.

Comparative Example 1

A 2 mol/L aqueous solution of sodium hydroxide (NaOH) was added dropwise to a 0.1 mol/L aqueous solution of ferric chloride (FeCl$_3$) at room temperature while adjusting the pH to pH 6 or less to perform reaction with the final amount of NaOH added set at NaOH/FeCl$_3$ (molar ratio)=2.83, thereby obtaining a particle suspension of iron oxyhydroxide. The total concentration of ferric chloride and sodium hydroxide was 2.4% by mass in the above.

The suspension was filtered and the resultant was dried in the air at 60° C. to obtain iron oxyhydroxide particles (3) containing NaCl. The content of NaCl in iron oxyhydroxide particle (3) was 2.7% by mass on average when iron oxyhydroxide particle (3) was taken as 100.

Iron oxyhydroxide particles (3) were washed with ion exchange water and the resultant was dried in the air at 60° C. to obtain iron oxyhydroxide particles (4). The content of NaCl in iron oxyhydroxide particle (4) was 0.5% by mass on average when iron oxyhydroxide particle (4) was taken as 100.

Iron oxyhydroxide particles (4) obtained above had a particle size of 0.25 mm to 5 mm. X-ray diffraction showed that the iron oxyhydroxide had a β-type crystal structure and an average crystallite size of 5 nm.

The state observed using a transmission electron microscope (TEM) is shown in FIG. 3. An image at a higher magnification is shown in FIG. 4. The TEM observation showed that crystallites had a size of 5 to 10 nm and individual crystals were granular and firmly coagulated to form a grain.

Furthermore, the particles had a specific surface area of 139 m$^2$/g, a total pore volume of 0.15 ml/g, a chloride ion content of 4.8 wt %, a true density of 3.67 g/cm$^3$, and a bulk density of 1.28 g/cm$^3$.

The pore size distribution is shown in FIG. 5. The peak was at about 2.0 nm.

Measurement Example 1 (Batch Adsorption Test for Phosphoric Acid Using Adsorbent Particle)

Potassium dihydrogen phosphate was dissolved in ion exchange water, and the pH was adjusted to pH 3.5 with hydrochloric acid, and to pH 7.0 with sodium hydroxide, respectively, to prepare test solutions G, H having a concentration of 400 mg-P/L (in terms of phosphorus).

The adsorbents of Example 1 and Comparative Example 1 were each classified through a sieve into particles of 0.25 mm to 0.5 mm, and 1 g of the particles was added to 150 mL of each of test solutions G, H, and then the mixture was stirred and subjected to an adsorption test. The solution was sampled after a predetermined time and solid components were separated with a syringe filter, and the solution sampled was analyzed for phosphorus concentration by ICP (inductively coupled plasma) to calculate the adsorbed amount. The pH was also measured. The results are shown in Table 1.

Measurement Example 2 (Flow Adsorption Test for Phosphoric Acid Using Adsorbent Particle)

Potassium dihydrogen phosphate was dissolved in ion exchange water, and the pH was adjusted to pH 3.0 with hydrochloric acid to prepare test solution I having a concentration of 100 mg-P/L (in terms of phosphorus).

The adsorbents of Example 1 and Comparative Example 1 were each classified through a sieve into particles of 0.25 mm to 0.5 mm, and 20 g of the particles was loaded onto a column having an inner diameter of 26 mm φ. Test solution I was passed through the column from the top at a flow rate (SV) of 20 and 50, respectively, and the liquid from the bottom of the column was sampled and solid components were separated with a syringe filter, and the solution sampled was analyzed for phosphorus concentration by ICP to calculate the adsorbed amount. The time when the concentration of phosphorus in the liquid from the bottom of the column reached 10 mg-P/L was defined as the breakthrough point. The results are shown in Table 2.

TABLE 1

Amount of phosphorus adsorbed and change in pH in batch test of adsorbent particle

| Type of adsorbent | Test solution | Adsorption time hr | Amount of phosphorus adsorbed mg-P/g | pH |
| --- | --- | --- | --- | --- |
| Example 1 iron oxyhydroxide particle (2) sieved to 0.25 to 0.5 mm | Test Solution G pH 3.5 | 0 | 0 | 3.5 |
| | | 0.05 | 9.0 | 3.4 |
| | | 1 | 22.9 | 3.9 |
| | | 2 | 26.6 | 4.1 |
| | | 24 | 34.9 | 5.0 |
| Comparative Example 1 iron oxyhydroxide particle (4) sieved to 0.25 to 0.5 mm | Test Solution G pH 3.5 | 0 | 0 | 3.4 |
| | | 0.05 | 3.0 | 3.3 |
| | | 1 | 11.2 | 3.1 |
| | | 2 | 14.2 | 3.1 |
| | | 24 | 18.3 | 3.3 |
| Example 1 iron oxyhydroxide particle (2) sieved to 0.25 to 0.5 mm | Test Solution H pH 7.0 | 0 | 0 | 7.0 |
| | | 0.05 | 4.7 | 6.4 |
| | | 1 | 11.7 | 6.2 |
| | | 2 | 15.7 | 6.3 |
| | | 24 | 22.0 | 6.8 |
| Comparative Example 1 iron oxyhydroxide particle (4) sieved to 0.25 to 0.5 mm | Test Solution H pH 7.0 | 0 | 0 | 7.0 |
| | | 0.05 | 1.6 | 6.7 |
| | | 1 | 5.0 | 6.1 |
| | | 2 | 7.5 | 6.1 |
| | | 24 | 12.2 | 6.2 |

TABLE 2

Amount of phosphorus adsorbed at breakthrough in flow test of adsorbent particle

| Type of adsorbent | Test solution | Flow rate SV 1/hr | Amount of phosphorus adsorbed at breakthrough g-P/L |
|---|---|---|---|
| Example 1 iron oxyhydroxide particle (2) sieved to 0.25 to 0.5 mm | Test Solution I | 20 | 28.5 |
| Comparative Example 1 iron oxyhydroxide particle (4) sieved to 0.25 to 0.5 mm | Test Solution I | 20 | 16.2 |
| Example 1 iron oxyhydroxide particle (2) sieved to 0.25 to 0.5 mm | Test Solution I | 50 | 18.4 |
| Comparative Example 1 iron oxyhydroxide particle (4) sieved to 0.25 to 0.5 mm | Test Solution I | 50 | 6.1 |

Measurement Example 4 (Batch Adsorption Test for Phosphoric Acid Using Adsorbent Particle)

Digested sludge collected from a digestion tank of a sewage treatment plant was dehydrated to obtain dehydrated filtrate (test solution A1, pH 7.9). SS (suspended substances) were removed by filtering test solution A1 to obtain test solution B1 (pH 7.8). Hydrochloric acid was added to each of test solutions A1 and B1 to adjust the pH to 3.5 to obtain test solutions A2 and B2.

The content of the respective components in test solution B1 was measured by ICP or ion chromatography. The results are shown in Table 3.

The adsorbent of Example 1 was classified through a sieve into particles of 0.25 mm to 0.5 mm, and 1 g of the particles was added to 150 mL of each of test solutions A1, B1, A2 and B2, and the mixture was stirred and subjected to an adsorption test. The solution was sampled after a predetermined time and solid components were separated with a syringe filter, and the solution sampled was analyzed for phosphorus concentration by ICP to calculate the adsorbed amount. The pH was also measured. The results are shown in Table 4.

TABLE 3

Analysis of components of dehydrated filtrate

| Method | Component | Content (µg/g) |
|---|---|---|
| ICP (quantitative) | P | 290 |
|  | S | 9.7 |
| ICP (qualitative) | K | 200 |
|  | Na | 100 |
|  | Ca | 30 |
|  | Si | 20 |
|  | Mg | 2 |
| Ion chromatography | $PO_4^{3-}$ | 850 |
|  | $Cl^-$ | 270 |
|  | $Br^-$ | 13 |
|  | $SO_4^{2-}$ | 5 |
|  | Acetic acid | 760 |
|  | Propionic acid | 100* |
|  | $CO_3^{2-}$ | 5000* |
|  | $NH_4^+$ | 2000 |

*Accurate determination was difficult because of the overlapped peaks of propionic acid and $CO_3^{2-}$ and thus order analysis was employed.

TABLE 4

Amount of phosphorus adsorbed and change in pH in batch test using dehydrated filtrate of digested sludge

| Type of adsorbent | Test solution | Adsorption time hr | Amount of phosphorus adsorbed mg-P/g | pH |
|---|---|---|---|---|
| Example 1 iron oxyhydroxide particle (2) sieved to 0.25 to 0.5 mm | A2 pH 3.5 | 0 | 0 | 3.5 |
|  |  | 0.05 | 3.1 | 3.5 |
|  |  | 1 | 13.5 | 3.6 |
|  |  | 2 | 17.5 | 3.7 |
|  |  | 4 | 21.8 | 3.8 |
|  |  | 24 | 31.0 | 4.1 |
|  | B2 pH 3.5 | 0 | 0 | 3.5 |
|  |  | 0.05 | 3.3 | 3.5 |
|  |  | 1 | 13.2 | 3.6 |
|  |  | 2 | 17.3 | 3.6 |
|  |  | 4 | 21.6 | 3.7 |
|  |  | 24 | 31.0 | 3.9 |
|  | A1 pH 7.9 | 0 | 0 | 7.9 |
|  |  | 0.05 | 1.7 | 7.8 |
|  |  | 1 | 6.7 | 7.9 |
|  |  | 2 | 8.1 | 8.1 |
|  |  | 4 | 9.9 | 8.3 |
|  |  | 24 | 14.0 | 9.0 |
|  | B1 pH 7.8 | 0 | 0 | 7.8 |
|  |  | 0.05 | 1.9 | 7.8 |
|  |  | 1 | 6.7 | 8.0 |
|  |  | 2 | 8.7 | 8.2 |
|  |  | 4 | 10.1 | 8.4 |
|  |  | 24 | 14.4 | 8.8 |

The above results show that the anion adsorbent particle of the present invention has a rate of adsorbing phosphoric acid remarkably higher than that of the adsorbent particles of Comparative Examples, a final adsorbed amount in a batch test and an adsorbed amount at breakthrough in a flow test remarkably larger than those of the adsorbent particles of Comparative Examples, and has a particularly large adsorbed amount at pH 3.5. Furthermore, properties of the adsorbent particle of the present invention has been found to be much different from those of the adsorbent particles of Comparative Examples in that the initial pH adjusted at 3.5 increased to pH 4 or more in about 2 hours. Moreover, even when the target was dehydrated filtrate of digested sludge containing various components, adsorption efficiency for phosphoric acid was not inhibited and was equivalent to that in a model test.

Example 2 (Product Having Adjusted Chloride Ion Content)

Adsorbent particles prepared in the same manner as in Example 1 were loaded onto a column, and a 10 wt % aqueous solution of sodium hydroxide was passed through the column and then diluted hydrochloric acid having a pH of 2.5 was passed through the column to obtain adsorbent particles of Example 2.

Example 3 (Product Having Adjusted Chloride Ion Content)

Adsorbent particles prepared in Example 1 were loaded onto a column, and a 10 wt % aqueous solution of sodium hydroxide was passed through the column, then diluted hydrochloric acid having a pH of 2.5 was passed through the column, and then pure water was passed through it until no chlorine is present in the eluent to obtain adsorbent particles of Example 3.

The results of the measurement of the specific surface area, total pore volume, average crystallite size and chloride ion content in Example 2 and Example 3 are shown in Table 5.

TABLE 5

Properties of products having adjusted chloride ion content

| Adsorbent | Specific surface area ($m^2/g$) | Total pore volume ($cm^3/g$ (1.0 to 100 nm)) | Average crystallite size (nm) | Chloride ion content (wt %) |
|---|---|---|---|---|
| Example 2 | 260 | 0.20 | 6.1 | 3.4 |
| Example 3 | 252 | 0.22 | 5.8 | 1.2 |

Measurement Example 5 (Adsorption Test for Phosphoric Acid Using Product Having Adjusted Chloride Ion Content)

1 g each of the adsorbent particles of Examples 2 and 3 was added to 150 mL of test solution G, and the mixture was stirred and subjected to an adsorption test to measure the amount of phosphoric acid adsorbed and change in pH in the same manner as in Measurement Example 1. The results are shown in Table 6.

TABLE 6

Results of adsorption test including change in pH using products having adjusted chloride ion content

| Type of adsorbent | Test solution | Adsorption time hr | Amount of phosphorus adsorbed mg-P/g | pH |
|---|---|---|---|---|
| Example 2 | Test Solution G pH 3.5 | 0 | 0 | 3.6 |
| | | 0.05 | 17.7 | 3.6 |
| | | 1 | 23.4 | 5.0 |
| | | 2 | 24.5 | 5.2 |
| | | 4 | 25.2 | 5.2 |
| | | 24 | 26.5 | 5.3 |
| Example 3 | Test Solution G pH 3.5 | 0 | 0 | 3.6 |
| | | 0.05 | 9.0 | 5.7 |
| | | 1 | 16.8 | 6.2 |
| | | 2 | 16.3 | 6.2 |
| | | 4 | 18.7 | 6.3 |
| | | 24 | 19.3 | 6.4 |

The above shows that a chloride ion content of about 3 wt % or more is preferred in terms of the adsorbed amount and adsorption rate.

The invention claimed is:

1. An adsorbent particle comprising iron oxyhydroxide having a β crystal structure, wherein:
   the content of iron oxyhydroxide in the adsorbent particle is 99% by mass or more,
   90% or more of the volume of the adsorbent particle is constituted of a granular crystal having a crystal grain size of 20 nm or less or a columnar crystal having a width of 10 nm or less and a length of 30 nm or less, and
   the adsorbent particle has a BET specific surface area of 250 $m^2/g$ or more.

2. The adsorbent particle according to claim 1, wherein the adsorbent particle has a total pore volume of 0.18 mL/g or more.

3. The adsorbent particle according to claim 1, wherein a crystal grain is observed using a transmission electron microscope without coagulation.

4. The adsorbent particle according to claim 1, wherein a part of hydroxyl groups of the iron oxyhydroxide is substituted by a chloride ion.

5. The adsorbent particle according to claim 1, wherein the adsorbent particle has an average particle diameter of 0.2 mm to 1.0 mm.

6. The adsorbent particle according to claim 1, wherein the adsorbent particle has a true density of 3 $g/cm^3$ or more and a bulk density of 1.2 $g/cm^3$ or more.

7. The adsorbent particle according to claim 1, wherein the adsorbent particle is an anion adsorbent particle.

8. The anion adsorbent particle according to claim 7, wherein an adsorbed amount in terms of phosphorus is 25 mg or more per g of the anion adsorbent article after 24 hours in a batch adsorption test in which (i) 1 g of the anion adsorbent particle is added to 150 mL of an aqueous solution of potassium dihydrogen phosphate adjusted to pH 3.5 with hydrochloric acid and having a concentration of 400 mg-P/L in terms of phosphorus to produce a mixture, (ii) the mixture of the anion adsorbent particle and the aqueous solution of potassium dihydrogen phosphate is stirred at room temperature, and (iii) the adsorbed amount in terms of phosphorus is determined by measuring the concentration of phosphate ions in the stirred mixture.

9. The anion adsorbent particle according to claim 7, wherein an adsorbed amount in terms of phosphorus is 20 mg or more per g of the anion adsorbent particle after 1 hour in a batch adsorption test in which (i) 1 g of the anion adsorbent particle is added to 150 mL of an aqueous solution of potassium dihydrogen phosphate adjusted to pH 3.5 with hydrochloric acid and having a concentration of 400 mg-P/L in terms of phosphorus to produce a mixture, (ii) the mixture of the anion adsorbent particle and the aqueous solution of potassium dihydrogen phosphate is stirred at room temperature, and (iii) the adsorbed amount in terms of phosphorus is determined by measuring the concentration of phosphate ions in the stirred mixture.

10. The anion adsorbent particle according to claim 7, wherein, in a batch adsorption test in which (i) 1 g of the anion adsorbent particle is added to 150 mL of an aqueous solution of potassium dihydrogen phosphate adjusted to pH 3.5 with hydrochloric acid and having a concentration of 400 mg-P/L in terms of phosphorus to produce a mixture and (ii) the mixture of the anion adsorbent particle and the aqueous solution of potassium dihydrogen phosphate is stirred at room temperature, the pH after 24 hours is increased by 0.5 or more from the pH after 1 hour.

11. The anion adsorbent particle according to claim 7, wherein the anion adsorbent particle has an adsorbed amount at breakthrough of 20 g-P/L or more per volume of the anion adsorbent particle packed, in a flow test in which an aqueous solution of potassium dihydrogen phosphate adjusted to pH 3 with hydrochloric acid and having a concentration of 100 mg-P/L in terms of phosphorus is passed through a column having an inner diameter of 26 mm φ packed with 20 g of the anion adsorbent particle at room temperature at a flow rate (SV) of 20 hr$^{-1}$.

12. The anion adsorbent particle according to claim 11, wherein the anion adsorbent particle has an adsorbed amount at breakthrough of 10 g-P/L or more at a flow rate (SV) of 50 hr$^{-1}$.

13. A method for producing the adsorbent particle according to claim 1, comprising:
- a step of generating iron oxyhydroxide by adding a base represented by YOH to a solution comprising at least one iron compound selected from trivalent iron compounds represented by FeX$_3$ while adjusting the pH to 3-6, wherein:
  - Y represents a monovalent atom or atomic group, and
  - X represents a monovalent atom or atomic group other than OH; and
- optionally adding electrolytes, other than the at least one iron compound, by:
  - (i) dissolving, in the solution, an electrolyte other than the at least one iron compound before adding the base to the solution comprising the at least one iron compound, or
  - (ii) adding an electrolyte other than the iron compound, or a solution thereof, in the step of generating iron oxyhydroxide, wherein a total concentration of FeX$_3$, YOH and the optionally added electrolytes is 10% by mass or more at the completion of the step of generating iron oxyhydroxide.

14. A method for producing the adsorbent particle according to claim 1, comprising the steps of:
- generating iron oxyhydroxide by adding a base represented by YOH to a solution comprising at least one iron compound selected from trivalent iron compounds represented by FeX$_3$ while adjusting the pH to 3-6, wherein:
  - Y represents a monovalent atom or atomic group, and
  - X represents a monovalent atom or atomic group other than OH;
- recovering the generated iron oxyhydroxide in the form of a water-containing cake and drying the same to obtain a dried cake; and
- optionally, adding electrolytes other than the at least one iron compound, or a solution thereof, to the solution comprising the at least one iron compound after the step of generating iron oxyhydroxide and before the step of recovering the generated iron oxyhydroxide, wherein the dried cake comprises a total of 10% by mass or more of a by-product represented by YX and the optionally added electrolytes, wherein X and Y are the same as the above.

\* \* \* \* \*

UNITED STATES PATENT AND TRADEMARK OFFICE
CERTIFICATE OF CORRECTION

| | |
|---|---|
| PATENT NO. | : 10,843,166 B2 |
| APPLICATION NO. | : 16/062263 |
| DATED | : November 24, 2020 |
| INVENTOR(S) | : Toshiyasu Hirokawa et al. |

It is certified that error appears in the above-identified patent and that said Letters Patent is hereby corrected as shown below:

In the Claims

Column 16 In Claim 8, Line 3, "article" should be --particle--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*